i(12) United States Patent
Li et al.

(10) Patent No.: US 9,020,246 B2
(45) Date of Patent: Apr. 28, 2015

(54) SYSTEMS AND METHODS FOR VISUAL OBJECT MATCHING (71) Applicant: Google Inc., Mountain View, CA (US)

(72) Inventors: Yuan Li, Los Angeles, CA (US); Hartwig Adam, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/045,207

(22) Filed: Oct. 3, 2013

(65) Prior Publication Data

US 2014/0086481 A1 Mar. 27, 2014

Related U.S. Application Data (63) Continuation of application No. 13/181,015, filed on Jul. 12, 2011, now Pat. No. 8,577,131.

(51) Int. Cl.
G06K 9/62 (2006.01)
G06K 9/66 (2006.01)

(52) U.S. Cl.
CPC .. G06K 9/66 (2013.01); G06K 9/62 (2013.01); G06K 9/6256 (2013.01)

(58) Field of Classification Search
CPC ............ G06F 17/30247; G06F 17/30876; G06F 17/30011; G06F 17/30047; G06F 17/30858; G06F 17/30256; G06F 17/30321; G06F 17/30657; G06F 17/30784; G06F 17/3002; G06K 9/6256; G06K 9/62; G06K 9/00664; G06K 9/00758; G06K 9/6215; G06K 9/6262; G06K 9/6201; G06K 9/66; G06K 2009/6213; G06K 9/6212; G06Q 30/08; Y10S 707/99936; Y10S 707/99945; G06T 7/0022; G06N 99/002; G10L 15/142

USPC ......... 382/115, 159, 165, 173, 190, 195, 209, 382/224
See application file for complete search history.

(56) References Cited

U.S. PATENT DOCUMENTS 5,463,548 A 10/1995 Asada et al.
5,579,471 A * 11/1996 Barber et al. ................. 715/700

(Continued)

OTHER PUBLICATIONS

Wnuk et al., "Filtering Internet Image Search Results Towards Keyword Based Category Recognition", http://vision.ucla.edu/papers/wnukS08.pdf, Jun. 2008.

(Continued)

Primary Examiner — Vu Le
Assistant Examiner — Aklilu Woldemariam
(74) Attorney, Agent, or Firm — Fish & Richardson P.C.

(57) ABSTRACT

Systems and methods for improving visual object recognition by analyzing query images are disclosed. In one example, a visual object recognition module may determine query images matching objects of a training corpus utilized by the module. Matched query images may be added to the training corpus as training images of a matched object to expand the recognition of the object by the module. In another example, relevant candidate image corpora from a pool of image data may be automatically selected by matching the candidate image corpora against user query images. Selected image corpora may be added to a training corpus to improve recognition coverage. In yet another example, objects unknown to a visual object recognition module may be discovered by clustering query images. Clusters of similar query images may be annotated and added into a training corpus to improve recognition coverage.

17 Claims, 9 Drawing Sheets

(56) References Cited

U.S. PATENT DOCUMENTS

| | | | |
|---|---|---|---|
| 5,706,364 A | 1/1998 | Kopec et al. | |
| 5,751,286 A * | 5/1998 | Barber et al. | 715/835 |
| 6,173,275 B1 * | 1/2001 | Caid et al. | 706/14 |
| 6,628,808 B1 | 9/2003 | Bach et al. | |
| 6,721,733 B2 * | 4/2004 | Lipson et al. | 1/1 |
| 6,751,354 B2 | 6/2004 | Foote et al. | |
| 6,774,917 B1 * | 8/2004 | Foote et al. | 715/700 |
| 7,039,229 B2 | 5/2006 | Lin et al. | |
| 7,043,474 B2 | 5/2006 | Mojsilovic et al. | |
| 7,069,257 B2 | 6/2006 | Huang | |
| 7,860,347 B2 * | 12/2010 | Tang et al. | 382/305 |
| 8,510,283 B2 * | 8/2013 | Hull et al. | 707/706 |
| 8,520,949 B1 * | 8/2013 | Bissacco et al. | 382/190 |
| 8,533,162 B2 * | 9/2013 | Klinkigt et al. | 707/669 |
| 2002/0041705 A1 | 4/2002 | Lin et al. | |
| 2003/0061185 A1 | 3/2003 | Lee et al. | |
| 2004/0247177 A1 | 12/2004 | Rowe et al. | |
| 2005/0283450 A1 | 12/2005 | Matsugu et al. | |
| 2008/0170784 A1 | 7/2008 | Guerzhoy et al. | |
| 2008/0260257 A1 | 10/2008 | Rose | |
| 2009/0076996 A1 | 3/2009 | Hull et al. | |
| 2010/0332475 A1 * | 12/2010 | Birdwell et al. | 707/737 |
| 2011/0106845 A1 * | 5/2011 | Lipson et al. | 707/769 |
| 2011/0282900 A1 * | 11/2011 | Lipson et al. | 707/769 |
| 2012/0002880 A1 * | 1/2012 | Lipson et al. | 382/195 |
| 2012/0114248 A1 * | 5/2012 | Yang et al. | 382/190 |
| 2012/0143856 A1 * | 6/2012 | Klinkigt et al. | 707/723 |
| 2012/0155778 A1 * | 6/2012 | Buchmueller et al. | 382/209 |

OTHER PUBLICATIONS

Si et al., "Collaborative Image Retrieval via Regularized Metric Learning", http://www.cs.purdue/edu/homes/lis/acm_mmsys.pdf, Aug. 2006.

* cited by examiner

Computer Program Product 900

Signal Bearing Medium 901

Program Instructions 902

- receiving a plurality of query images;
- matching the plurality of query images to a plurality of objects using a visual object recognition module, wherein the visual object recognition module is configured to utilize information from a training corpus to match query images to one or more training images of the plurality of objects, wherein the training corpus comprises one or more training images associated with the plurality of objects;
- associating match scores with matches between the query images and one or more matched training images, wherein the visual object recognition module is configured to determine match scores indicating a level of similarity between the query images and one or more matched training images;
- determining matched and unmatched query images based on the match scores associated with the query images, wherein query images with match scores above a score threshold are identified as matched query images and query images with match scores below the score threshold are identified as unmatched query images; and
- based on the determination, expanding the training corpus utilized by the visual object recognition module to include the matched query images, wherein the matched query images are added as training images associated with the objects to which the matched training images are associated.

| Computer Readable Medium 903 | Computer Recordable Medium 904 | Communications Medium 905 |

FIGURE 9

SYSTEMS AND METHODS FOR VISUAL OBJECT MATCHING

CROSS-REFERENCE TO RELATED APPLICATIONS

This application is a continuation of U.S. patent application Ser. No. 13/181,015 filed Jul. 12, 2011, the contents of which are hereby incorporated by reference.

FIELD

This disclosure relates to object recognition, and in examples, to training images used by a recognition engine.

BACKGROUND

The ability to recognize objects can be used in many applications. While humans may easily identify a given object within an image or video, the same task may be complex for computer vision systems. Numerous approaches and techniques have been developed to attempt to recognize objects using computer vision systems. One example includes training a recognition engine, or matcher, using a set of training, or reference, images.

A matcher may have knowledge of a set of training images used for recognizing objects. For example, training corpora may contain images of a set of objects, with one or more images of visual appearances of the object, as well as metadata identifying the objects. Given an image of an object to be recognized, the matcher may retrieve training images similar to the object and determine a match. Often times corresponding metadata of the matched training images may also be returned, such as a type, name, title, etc., of the recognized object.

SUMMARY

This disclosure may disclose, inter alia, systems and methods for improving visual object recognition by analyzing query images from users.

In one example, a method for expanding a training corpus utilized by a visual object recognition module is provided. The method includes, but is not limited to, receiving a plurality of query images and matching the plurality of query images to a plurality of objects using a visual object recognition module. The visual object recognition module may be configured to utilize information from a training corpus to match query images to one or more training images of the plurality of objects, for example. The training corpus may include one or more training images associated with the plurality of objects. The method further includes associating match scores with matches between the query images and one or more matched training images. Match scores may be provided by the visual object recognition module indicating a level of similarity between the query images and one or more matched training images. The method also includes determining matched and unmatched query images based on the match scores associated with the query images. Query images with match scores above a score threshold are identified as matched query images and query images with match scores below the score threshold are identified as unmatched query images. Based on the determination, the training corpus utilized by the visual object recognition module may be expanded to include the matched query images. According to the method, the matched query images may be added as training images associated with the objects to which the matched training images are associated.

In another example, a non-transitory computer-readable medium with instructions stored thereon is provided. The instructions may be executable by a computing device. The instructions may be executable for receiving a plurality of query images and matching the plurality of query images to a plurality of objects using a visual object recognition module. The visual object recognition module may be configured to utilize information from a training corpus to match query images to one or more training images of the plurality of objects, for example. The training corpus may include one or more training images associated with the plurality of objects. The instructions may be further executable for associating match scores with matches between the query images and one or more matched training images. Match scores may be provided by the visual object recognition module indicating a level of similarity between the query images and one or more matched training images. The instructions may also be executable for determining matched and unmatched query images based on the match scores associated with the query images. Query images with match scores above a score threshold are identified as matched query images and query images with match scores below the score threshold are identified as unmatched query images. Based on the determination, the training corpus utilized by the visual object recognition module may be expanded to include the matched query images. According to the instructions, the matched query images may be added as training images associated with the objects to which the matched training images are associated.

In another example, a system is provided. The system involves a memory and a processor coupled to the memory. The system further includes instructions, executable by the processor, stored in the memory. The instructions may be executable by the processor for receiving a plurality of query images and matching the plurality of query images to a plurality of objects using a visual object recognition module. The visual object recognition module may be configured to utilize information from a training corpus to match query images to one or more training images of the plurality of objects, for example. The training corpus may include one or more training images associated with the plurality of objects. The instructions may be further executable for associating match scores with matches between the query images and one or more matched training images. Match scores may be provided by the visual object recognition module indicating a level of similarity between the query images and one or more matched training images. The instructions may also be executable for determining matched and unmatched query images based on the match scores associated with the query images. Query images with match scores above a score threshold are identified as matched query images and query images with match scores below the score threshold are identified as unmatched query images. Based on the determination, the training corpus utilized by the visual object recognition module may be expanded to include the matched query images. According to the instructions, the matched query images may be added as training images associated with the objects to which the matched training images are associated.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 9 is a schematic illustrating a conceptual partial view of an example computer program product that includes a computer program for executing a computer process on a computing device, arranged according to at least some embodiments presented herein.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, systems and methods for improving visual object recognition by analyzing query images from users. The systems and methods may be directed to expanding a training corpus utilized by the visual object recognition module to improve visual object recognition. A plurality of query images provided by users may be analyzed to improve recognition coverage and/or to enrich models of objects described within the training corpus.

In one example, a plurality of query images is received. The plurality of query images may be matched to a plurality of objects using a visual object recognition module. The visual object recognition module may be configured to utilize information from a training corpus to match query images to one more training images of the plurality of objects, for example. Additionally, match scores associated with matches between the query images and one more matched training images may be provided by the visual object recognition module. A determination, based on the match scores, may be used to classify images within the received plurality of query images as matched or unmatched query images. In some examples, matched query images may be added as training images associated with the objects to which the matched training images are associated.

In one example, one or more of the matched query images added to the training corpus may be an image of one of the plurality of objects with a variation in illumination of the object, pose of the object, and/or shape of the object, among other possible variations.

In another example, given a large set of data sources as candidate image corpora, a method may automatically select useful data based on relevancy to the plurality of query images. The candidate image corpora may be added to the training corpus to expand the training corpus.

In another example, previously unknown objects depicted in the plurality of query images may be discovered by clustering unmatched query images. The query images of the discovered objects may be annotated and added to the training corpus as training images.

Figure 1:
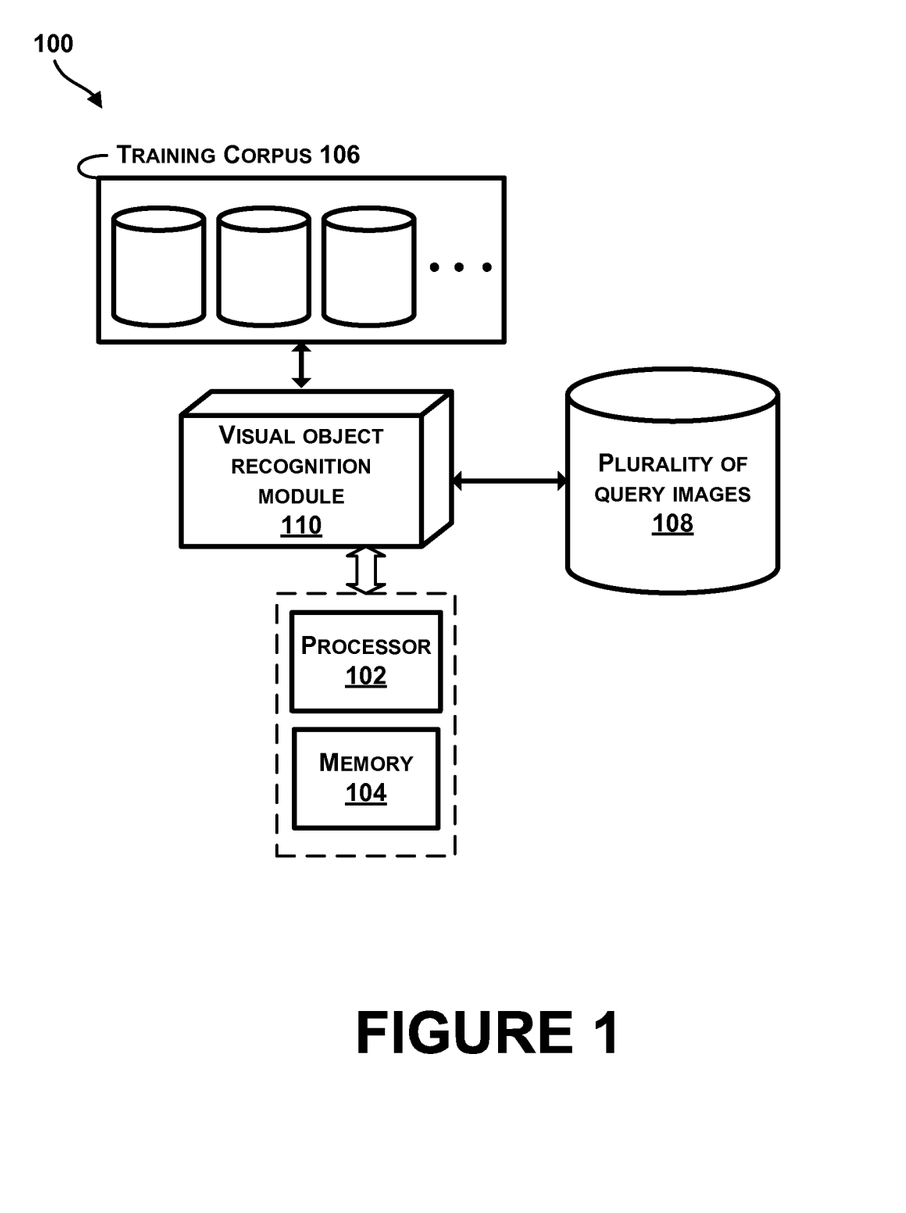
FIG. 1 illustrates an example system.

Referring now to the figures, FIG. 1 illustrates an example system 100. One or more parts of the system 100 may be used to perform methods for improving visual object recognition by analyzing user query images. The system 100 may include a processor 102 coupled to a memory 104. Additionally the system 100 may include a training corpus 106, a plurality of query images 108, and a visual object recognition module 110, all of which may be coupled to the processor 102 and the memory 104.

The processor 102 may be any type of processor, such as a microprocessor, digital signal processor (DSP), multicore processor, etc., coupled to the memory 104. The memory 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

In one embodiment, the training corpus 106 may include a set of objects. For each object, there may be one or more training images containing visual appearances of the object, as well as metadata associated with the object (e.g., type, name, etc.).

In some examples, information within the training corpus 106 may be processed for use by the visual object recognition module 110. For example, raw image data may be processed for comparing image similarity within a matching routine. Alternatively, matching may be performed based on image templates as an alternative to matching raw image data. Matching image templates may be a more effective method than matching raw image data in terms of computing image similarity, for example.

In one example, for each image, descriptors for image interest points may be extracted and an image template may be built. A descriptor may include information extracted from local pixels around an image interest point. An image interest point may be a point in the image that can have a clear definition (e.g., may be mathematically well-founded), can have a well-defined position in image space, can have a local image structure that is rich in terms of local information contents, and is stable under local and global perturbations in the image domain. In some examples, a template may include the extracted information of the image and a set of descriptors of all interest points in the image.

The plurality of query images 108 may contain images submitted by one or more users. Images of the plurality of query images 108 may be of any size, shape, and/or form. Similarly, the plurality of query images 108 may be two-dimensional (e.g., photographs, figures, pictures) or three-dimensional (e.g., a hologram). The plurality of query images 108 may be captured by optical devices (cameras, mirrors, lenses, etc.) or otherwise input by a system or user (e.g., visual sketch drawn or otherwise rendered on an input surface). In one example, images within the plurality of query images 108 may be frames captured from a moving image.

In some examples, the plurality of query images 108 may include images provided in order to perform content-based image retrieval. Content from within the images may be analyzed and training images matching the content of the images may be returned. For example, content of images within the plurality of query images 108 may refer to colors, shapes, textures, or other information derived from an image. In some examples, the plurality of query images 108 may include images submitted by users containing metadata such as keywords, tags, or other descriptions associated with the images.

The visual object recognition module 110 may include one or more programming instructions, for example, computer executable and/or logic implemented instructions to perform functions or steps. Additionally, the visual object recognition module 108 may be circuitry wired to perform one or more programming instructions.

In one example, the visual object recognition module 110 may have access to and interact with a set of training images of the training corpus 106. Given a query image of the plurality of query images 108, the visual object recognition module 110 may retrieve and output training images that are similar to the query image. For example, the visual object recognition module 110 may determine one or more training images having image descriptors or image templates similar to the query image. For example, the number of similar image descriptors between a training image and the query image may be above a threshold. Accordingly, the training image may be determined to be a match to the query image. Other example methods and techniques used for image matching include template matching, normalized cross-correlation, or multi-variate cross-correlation.

Additionally, for each similar training image, a match score may be provided. For example, the match score may be computed based on a combination of one or more of a number of matched descriptors between the query image and a training image, a computed similarity between raw image data of the query image and a training image, or other potential image comparison algorithms or methods. Moreover, the visual object recognition module 110 may output corresponding metadata of the matched training images.

Figure 2:
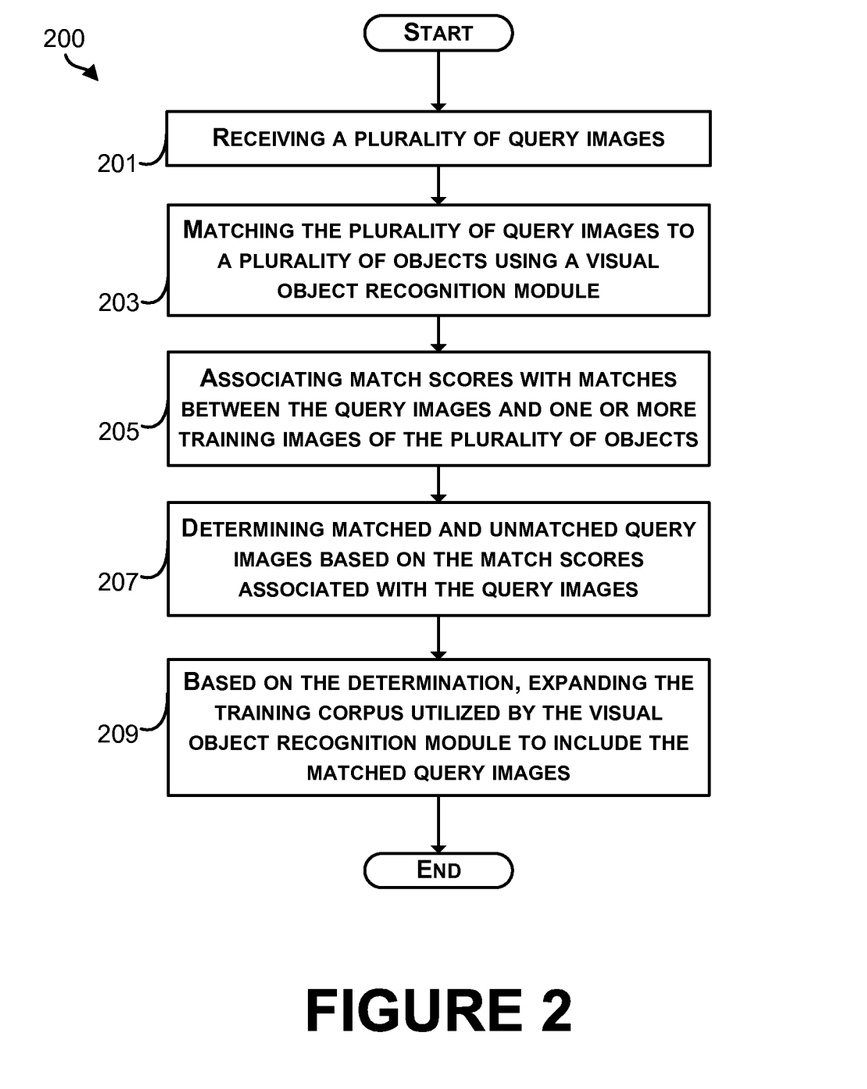
FIG. 2 is an example block diagram of a method to expand a training corpus to include matched query images, in accordance with at least some embodiments described herein.

FIG. 2 is an example block diagram of a method 200 to expand a training corpus to include matched query images, in accordance with at least some embodiments described herein. The method 200 shown in FIG. 2 presents an embodiment of a method that may, for example, be used by the system 100 of FIG. 1. Method 200 may include one or more operations, functions, or actions as illustrated by one or more of blocks 201-209. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 201, the method 200 includes receiving a plurality of query images. Query images may be collected and stored over time by a system which receives query images from users. Alternatively, a group of query images for use by the method 200 may be received simultaneously. In one example, the plurality of query images may be user submitted images for which information is desired. A user may submit a query image in order to find images matching the query image, or to find information about the query image, for example. Images matching the query image may include metadata associated with and/or describing the matched images that may be output to the user. Additionally, one or more of the plurality of query images may be a query image comprising multiple images.

Images within the plurality of a query images may be of one or more of any number of image file formats. For example, the plurality of query images may include one or more image files composed of either pixel or vector data that are rasterized to pixels when displayed in a vector graphic display. Example image file formats include JPEG, JPEG 2000, TIFF, RAW, PNG, GIF, BMP, among other possible image file formats. Similarly, images of the plurality of query images may optionally be compressed using a variety of image compression techniques. In some examples, the method 200 includes decompressing images of the plurality of query images for use in conjunction with the method 200 and/or other systems and methods disclosed.

At block 203, the method 200 includes matching the plurality of query images to a plurality of objects using a visual object recognition module. Given a query image, the visual object recognition module may retrieve and output one or more training images of a training corpus matching the query image. The training corpus may include one or more training images associated with the plurality of objects, for example.

In one example, a query image may be an image of a matched object differing from training images of the object within the training corpus. The query image may, for example, be matched to a training image from the plurality of objects of the training corpus with a variation in illumination of the object. The query image may have been captured under different lighting settings compared with the illumination of the object within the training images of the object. Similarly, in another example, the query image may be an image of a matched object with a variation in pose or shape of the object.

In one example, the visual object recognition module may match a region or multiple regions of a query image to one or more training images. In another example, the visual object recognition module may also output a matched region and/or matched descriptors associated with a matching query image and training image.

At block 205, the method 200 includes associating match scores with matches between the query images and one or more training images of the plurality of objects. The match score may indicate a level of similarity between a query image and a matching training image, for example. Matches may be prioritized or ranked based on the match scores. In one example, the similarity may be computed based on a number of matched descriptors between a query image and a training image. However, other methods of determining similarity are also contemplated. In one example, an image distance measure may compare the similarity of two images in various dimensions such as color, texture, shape, and others. For example, color histograms of images may be compared, where a color histogram is computed by quantizing the colors within an image and counting the number of pixels of each color. In another example, an intensity-based method may be used to compare patterns in a query image and a training image using correlation metrics.

At block 207, the method 200 includes determining matched and unmatched query images based on the match scores associated with the query images. In one example, query images with matches and corresponding match scores above a score threshold may be identified as matched query images. Meanwhile, query images with match scores below the score threshold may be identified as unmatched query images. For example, the match score threshold may be determined based on a number of matching image descriptors. Alternatively, the match score threshold may be determined based on a combination of values of matching attributes associated with visual attributes or features of the images. For example, query images with a matching training image with attribute values associated with color, texture, and structure each above a threshold requirement, the query images may be determined to be matched query images. In some examples, the matching attributes may be similar to distance measures used to determine similar images.

In another example, query images without any matches to training images may be identified as unmatched query images, while query images with matching training images may be identifies as matched query images. Alternatively, query images with a number of related matched training images less than or equal to a threshold may be determined to be unmatched query images, while query images with a number of related matched training images greater than the threshold may be determined to be matched training images.

At block 209, the method 200 includes based on the determination, expanding the training corpus utilized by the visual object recognition module to include the matched query images. The matched query images may be added as training images associated with the objects to which the matched training images are associated. Including images covering as much possible variation in visual appearance of objects of the training corpus may help improve visual matching accuracy. For example, the matched query images may be images captured under similar circumstances to circumstances a user may capture an object. Therefore, according to the method 200, images of existing objects within the plurality of objects from user query images may be added into the training corpus to improve the models of the objects utilized by the visual recognition module. In some examples, the visual object recognition module may be re-trained using the expanded training corpus.

In one example, metadata associated with the objects to which the matched training images are associated may be determined. The metadata may be associated with the matched query images added to the training corpora based on matches between query images and training images.

Figure 3:
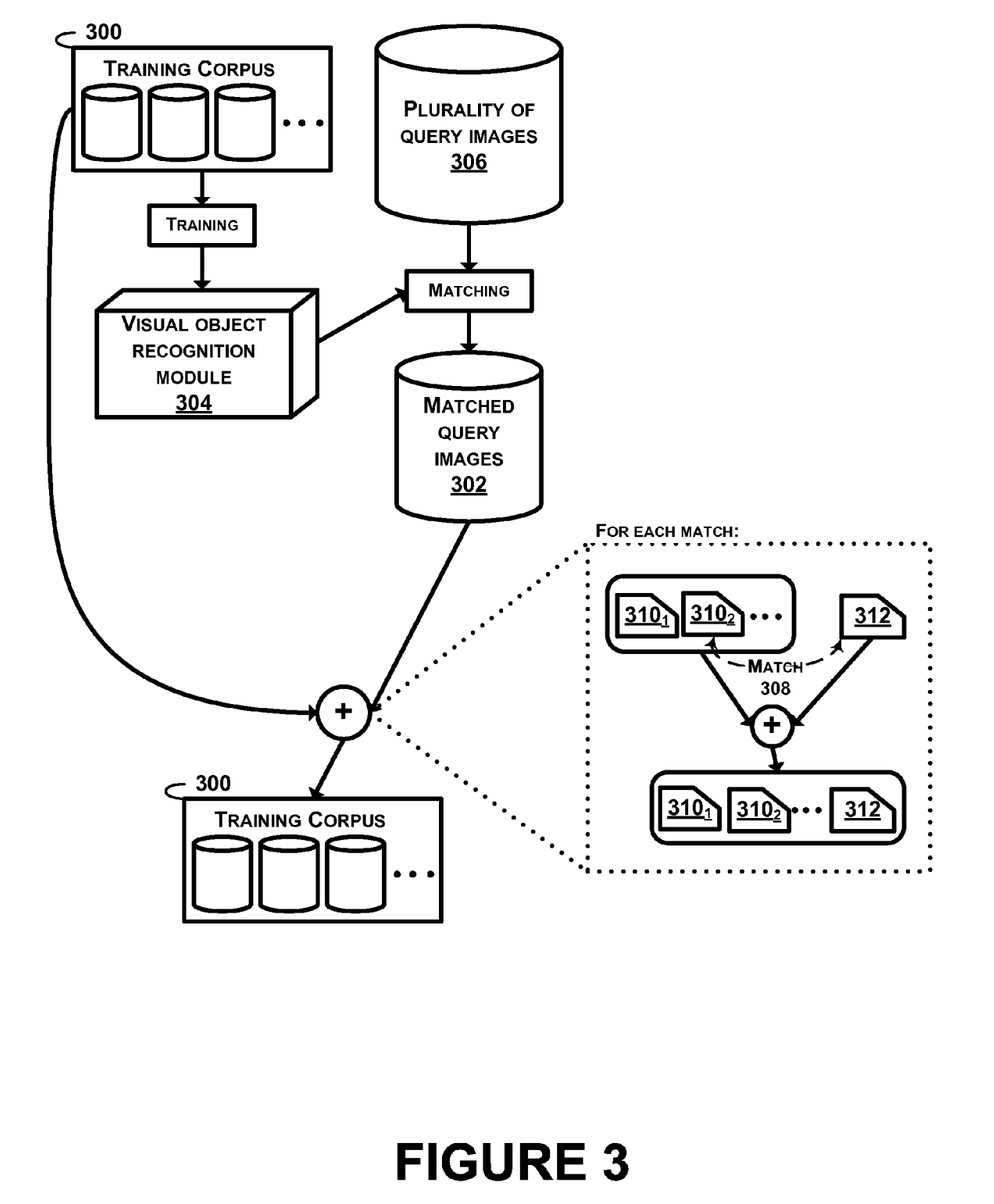
FIG. 3 illustrates an example of expanding a training corpus to include matched query images.

FIG. 3 illustrates an example of expanding a training corpus 300 to include matched query images 302. A visual object recognition module 304 may match user query images from a plurality of query images 306 utilizing the training corpus 300. For each match 308, between one or more training images $310_1$, $310_2$, ... $310_n$ and a user query image 312, the user query image 312 (or a matched region of the user query image 312) may be added as a new training image, for example, the user query image 312 may be included within the training corpus 300 as a training image of the object which the one or more training images $310_1$, $310_2$, ... $310_n$ are associated. The visual object recognition module 304 may then make use of the training corpus 300, expanded to include the additional matched query images 312 as training images.

Figure 4:
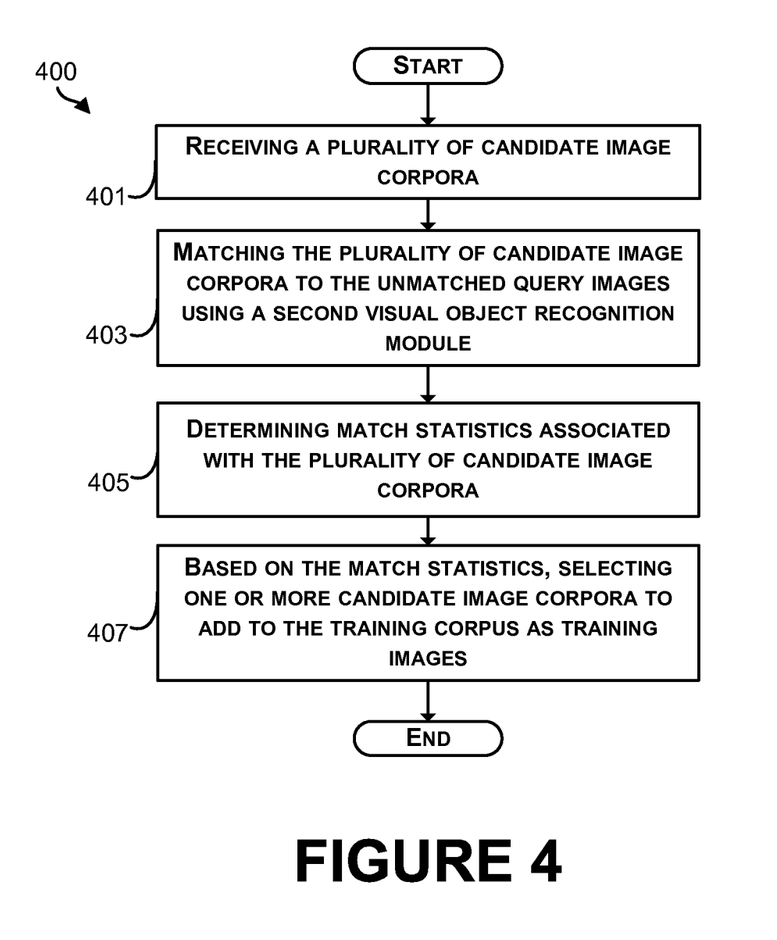
FIG. 4 is an example block diagram of a method to expand a training corpus to include one or more candidate image corpora, in accordance with at least some embodiments described herein.

FIG. 4 is an example block diagram of a method 400 to expand a training corpus to include one or more candidate image corpora, in accordance with at least some embodiments described herein. The method 400 shown in FIG. 4 presents an embodiment of a method that may, for example, be used by the system 100 of FIG. 1. Method 400 may include one or more operations, functions, or actions as illustrated by one or more of blocks 401-407. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 4 may represent circuitry that is wired to perform the specific logical functions in the process.

Initially, at block 401, the method 400 includes receiving a plurality of candidate image corpora. The plurality of candidate image corpora may be or include a large set or pool of image data sources. In some examples, the plurality of candidate image corpora may include one or more un-indexed data sources, for which no information or metadata is associated. However, in some examples, the plurality of candidate image corpora may include indexed data sources.

At block 403, the method 400 includes matching the plurality of candidate image corpora to unmatched query images using a visual object recognition module. The visual object recognition module may be configured to utilize information from a training corpus comprising unmatched query images to match images of the plurality of candidate image corpora to one or more of the unmatched query images and to associate match scores with the matches. In one example, the second visual object recognition module may be the visual object recognition module 110 of FIG. 1. Alternatively, the second visual object recognition module may be a separate visual object recognition module. The unmatched query images may be query images which do not match training images of a first training corpus. For example, the unmatched query images may be determined according to the method 200 of FIG. 2.

At block 405, the method 400 includes determining match statistics associated with the plurality of candidate image corpora. Statistics for each candidate image corpus of the plurality of candidate image corpora may be determined. The match statistics may be associated with a degree of utility in terms of improving coverage of a first training corpus utilized by a first visual object recognition module or matcher. For example, the match statistics may include a percentage of images within a corpus matching the unmatched query images. As another example, the match statistics may include a number of images within a corpus matching the unmatched query images. In some examples, a value of a match statistic may be associated with a usefulness of a candidate image corpus for matching query images if added to the first training corpus.

In one example, matched images within the plurality of candidate image corpora may be determined. Images from the plurality of candidate image corpora with a match score above a threshold may be identified as matched images. Moreover, the match statistics may include a percentage of matched images within the plurality of candidate image corpora.

At block 407, the method 400 includes, based on the matches, selecting one or more candidate image corpora to add to the training corpus as training images. The one or more candidate image corpora may be selected, for example, if a match statistic is above a certain value. A candidate image corpus may be selected if the percentage of matched images within the candidate image corpus is above a percentage threshold. Similarly, a candidate image corpus may be selected if a number of matched images within the candidate image corpus is above a number threshold.

The selected one or more candidate image corpora may be added to a training corpus as training images. For example, the one or more candidate image corpora may be added to the training corpus 106 of FIG. 1. Similarly, the visual object recognition module 110 of FIG. 1 may be re-trained using the expanded training corpus. Thus, relevant image corpora of the plurality of candidate image corpora may be added into a training corpus to improve recognition coverage.

In one example, the one or more selected candidate image corpora may be indexed. This may be accomplished by associating metadata with images from the one or more selected candidate image corpora and adding the images, as training images, to the first training corpus.

In one example, the method 400 may include determining samples of images associated with each of the plurality of candidate image corpora. The samples of images may be randomly selected as representative samples of each of the plurality of candidate image corpora. The samples of images may be matched to the unmatched query images using the second visual object recognition module. Match statistics may be determined and associated with each of the samples of images, and one or more candidate image corpora may be selected to be added to the first training corpus as training images based on the match statistics.

Figure 5:
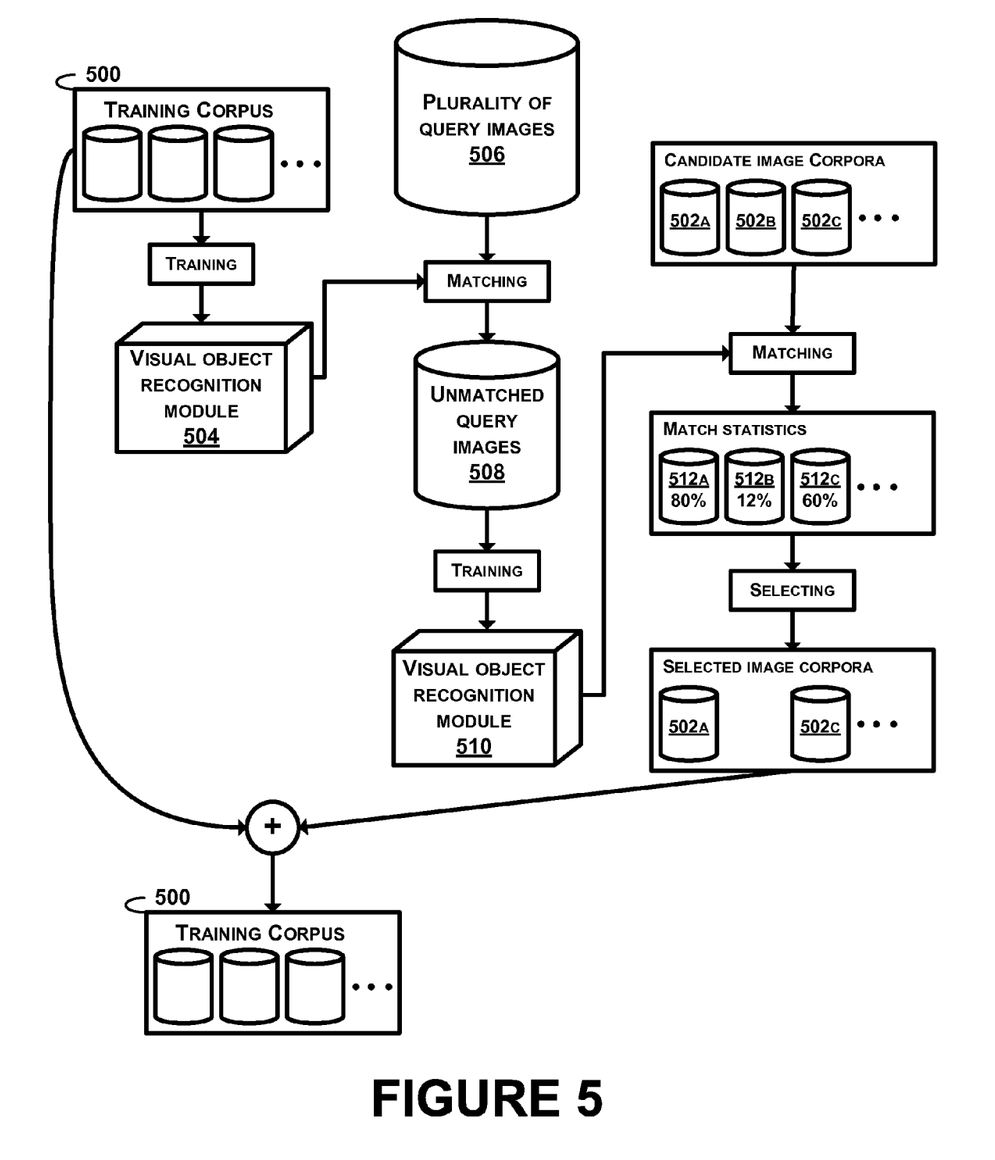
FIG. 5 illustrates an example of expanding a training corpus to include one more candidate image corpora.

FIG. 5 illustrates an example of expanding a training corpus 500 to include one more candidate image corpora 502a, 502b, 502c. A visual object recognition module 504 may match user query images from a plurality of query images 506 to training images of the training corpus 500. Based on the matching, unmatched query images 508 may be determined.

A second visual object recognition module 510 may be trained using the unmatched query images 508 as a second training corpus. The second visual object recognition module 510 may match the candidate image corpora 502a, 502b, 502c to the unmatched query images 508. Match statistics 512a, 512b, 512c for each of the candidate image corpora 502a, 502b, 502c may be determined based on a percentage (or number) of matched images within a candidate image corpus.

Additionally, candidate image corpora 502a, 502b, 502c may be selected based on the match statistics. For example, a match statistic threshold may be 55%. Accordingly, as illustrated in FIG. 5, candidate image corpora 502a, 502c may be selected.

Furthermore, the candidate image corpora 502a, 502c may be added to the training corpus 500 as training images. The visual objet recognition module 504 may, subsequently, be re-trained using the training corpus 500.

Figure 6:
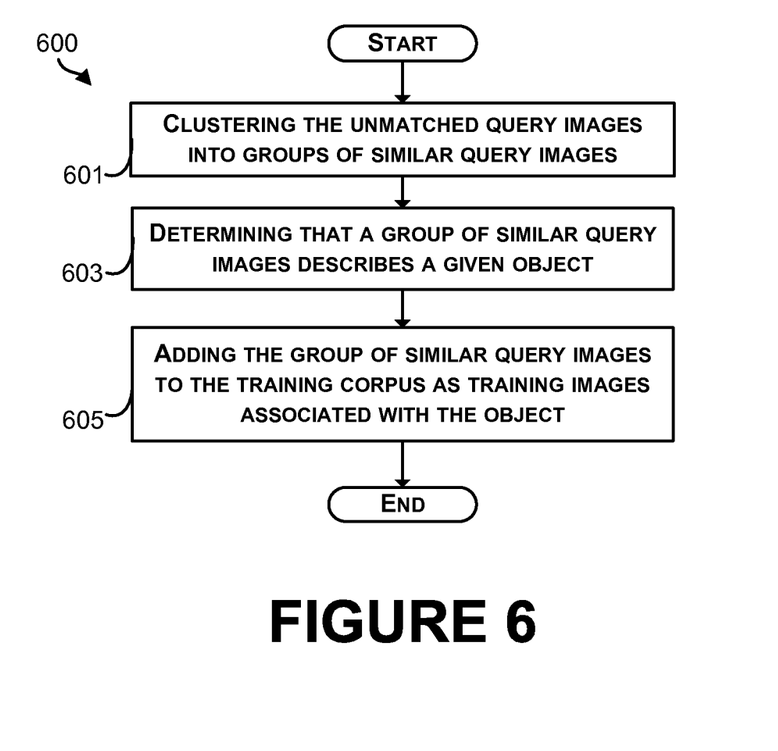
FIG. 6 is an example block diagram of a method to expand a training corpus to include unmatched query images, in accordance with at least some embodiments described herein.

FIG. 6 is an example block diagram of a method to expand a training corpus to include unmatched query images, in accordance with at least some embodiments described herein. The method 600 shown in FIG. 6 presents an embodiment of a method that may, for example, be used by the system 100 of FIG. 1. Method 600 may include one or more operations, functions, or actions as illustrated by one or more of blocks 601-605. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method. Each block may represent a module, a segment, or a portion of program code, which includes one or more instructions executable by a processor for implementing specific logical functions or steps in the process. In addition, each block in FIG. 6 may represent circuitry that is wired to perform the specific logical functions in the process.

Initially, at block 601, the method 600 includes clustering unmatched query images into groups of similar query images. The unmatched query images may be query images which do not match training images of a training corpus. For example, the unmatched query images may be determined according to the method 200 of FIG. 2. In some examples, the groups of similar query images may depict an object unknown or not included within the training corpus. Therefore, clusters of similar query images may represent new objects to be included within the training corpus in order to improve recognition coverage.

In one example, a group of unmatched query images may be clustered into groups of visually similar images using feature histograms to represent the images. Feature histograms may describe, for example, color, texture, coarseness, contrast, and directionality of pixels within an image. Various well known clustering methods, for example, k-means clustering, may be used.

In another example, image templates for the unmatched query images may be determined. The image templates may include a set of descriptors of information for image interest points identified within the unmatched query images. The image templates may be compared to determine similar images. For example, images with image templates having a matching number of image descriptors above a threshold may be determined to be similar images.

In a further example, the unmatched query images may form nodes in a graph. When a similarity is identified between image templates associated with the unmatched query images, the similarity may be represented by an edge (i.e., a line connecting the nodes) between the nodes. In some cases, nodes may be connected when a similarity between two image templates is above a threshold. For example, a visual object recognition module (e.g., the visual object recognition module of FIG. 1) may be used to determine similarities between the unmatched query images. Clustering of connected nodes within the graph may be performed.

Other clustering methods are also contemplated. For example, similarities may be determined between the unmatched query images. Various clustering algorithms and methods including k-means clustering, agglomerative or divisive hierarchical methods, among other algorithms and methods may be used to cluster the similarities between the unmatched query images into groups. Optionally, the clustering may include specifying a number of clusters to produce. However, clustering methods and algorithms operating without a specified number of clusters may be performed.

At block 603, the method 600 includes determining that a group of similar query images describes a given object. For example, groups of similar query images may be provided to a network or server. Information indicating objects which the groups of similar query images described may be received from the network or server. Also, metadata associated with the given object may be determined. The group of similar query images may be indexed by associating the metadata with the similar query images. For example, groups of similar query images may be matched to additional image corpora. A group of similar query images may be matched to one or more images of the additional image corpora. The one or more images may include associated metadata. In one example, the most commonly occurring instance of metadata (e.g., a name, title, type, etc.) (or multiple commonly occurring instances of metadata) within the one or more matched images may be determined and associated with the similar query images of the group. In another example, the groups of similar query images may be provided to users to be annotated with metadata (e.g., the users may determine the type and name of the object).

At block 605, the method 600 includes adding the group of similar query images to the training corpus as training images associated with the object. Annotated clusters may become training images of an object and be added to the training corpus. A visual object recognition module or matcher may be trained on the expanded training corpus, improving recognition coverage. Consequently, the visual object recognition module may be able to match previously unknown objects obtained in the method 600.

In one example, the method 600 may include filtering the groups of similar query images by removing groups where an amount of similar query images is below a threshold. This may, for example, eliminate noise due to small clusters within the groups of similar query images.

Figure 7:
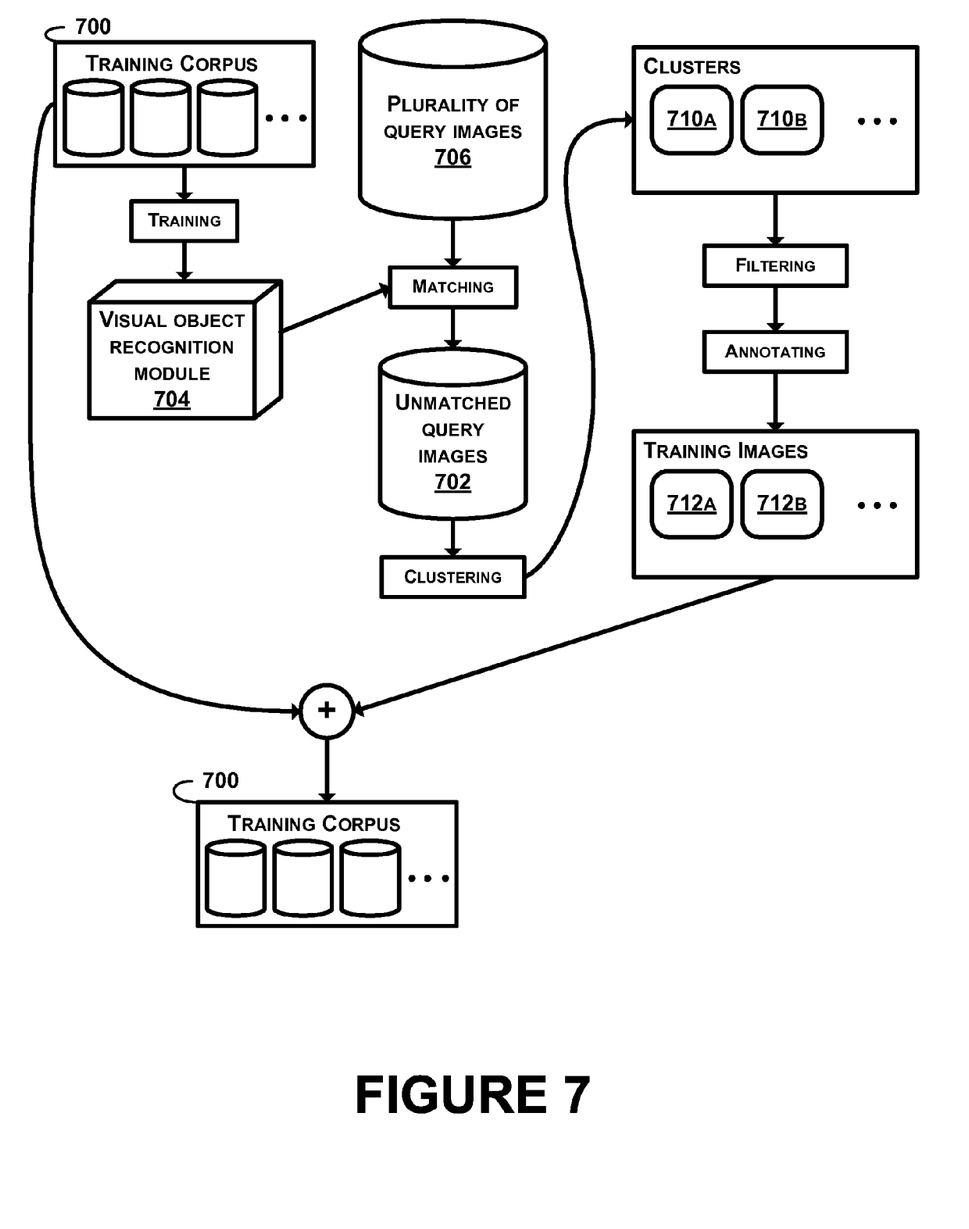
FIG. 7 illustrates an example of expanding a training corpus to include unmatched query images.

FIG. 7 illustrates an example of expanding a training corpus 700 to include unmatched query images 702. A visual object recognition module 704 may match user query images from a plurality of query images 706 to training images of the training corpus 700. Based on the matching, unmatched query images 702 may be determined. Unmatched query images 702 may be clustered into clusters 710a, 710b, each of which may include a number of similar query images of an object.

Clusters 710a, 710b, in some examples, may be filtered based on size to eliminate noise. Clusters 710a, 710b may also be annotated to include metadata associated with the object. With the addition of metadata to the clusters 710a, 710b, the clusters 710a, 710b may become training images 712a, 712b of objects. For example, cluster 710a may represent a first object and training images 712a may be annotated with metadata of the first object. The training images 712a, 712b may be added to the training corpus 700. Accordingly, the visual object recognition module may be re-trained using the training corpus 700, including the additional training images 712a, 712b.

In one example, a portion of similar images within a cluster 710a may be selected as training images 712a while another portion of images within the cluster 710a may not be added to the training corpus 700 as training images 712a. In another example, a cluster 712a may not be annotated or added to the training corpus 700 because the cluster 712a may not include images of one object. Alternatively, in another example, a cluster 712a may include images of multiple objects. The cluster 712a may be split into two separate groups of training images (not shown). Each of the separate groups may be added with metadata describing the multiple objects respectively.

Figure 8:
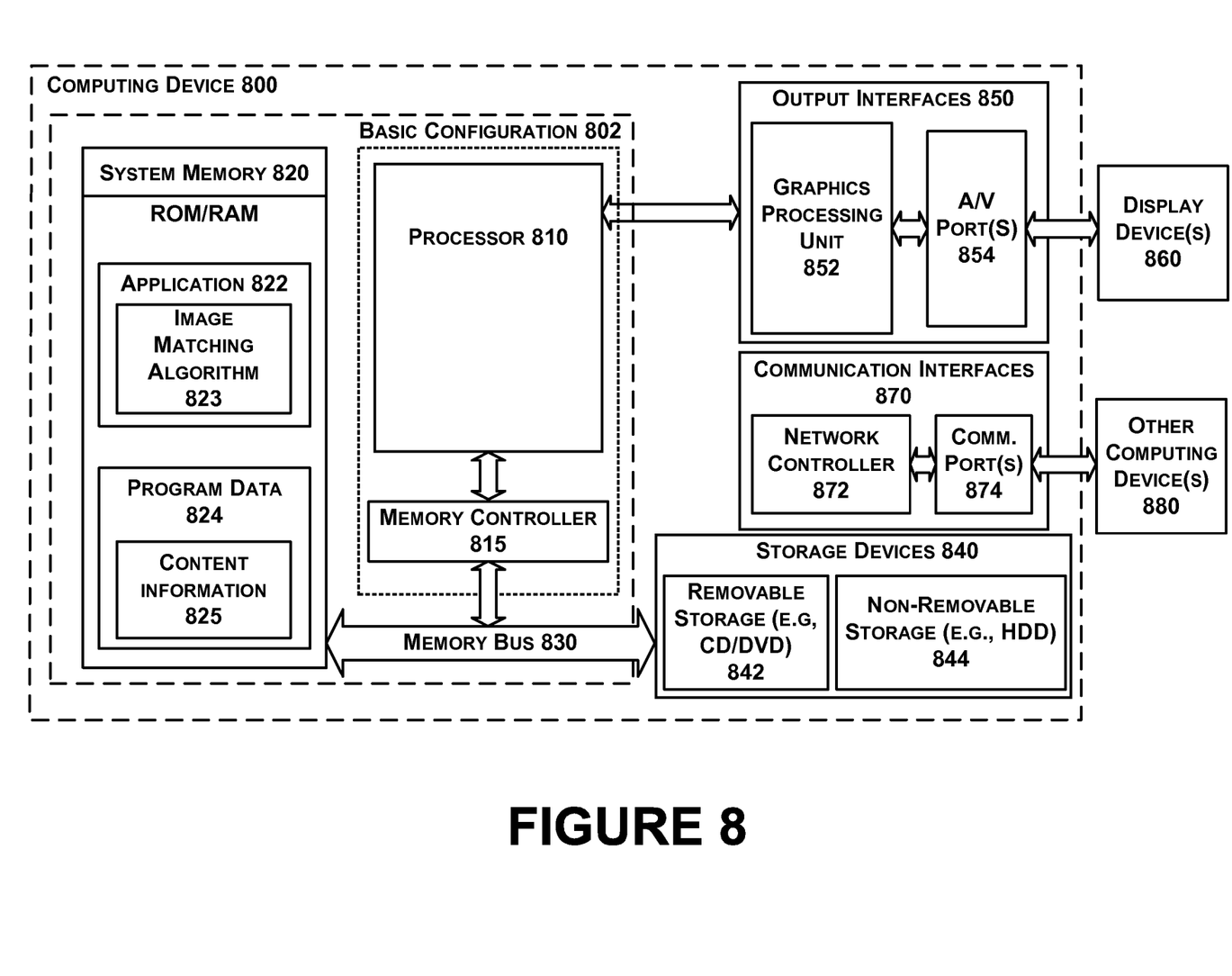
FIG. 8 is a functional block diagram illustrating an example computing device used in a computing system that is arranged in accordance with at least some embodiments described herein.

FIG. 8 is a functional block diagram illustrating an example computing device 800 used in a computing system that is arranged in accordance with at least some embodiments described herein. The computing device may be a personal computer, mobile device, cellular phone, touch-sensitive wristwatch, tablet computer, video game system, or global positioning system, and may be implemented to improve visual object recognition as described in FIGS. 1-7. In a basic configuration 802, computing device 800 may typically include one or more processors 810 and system memory 820. A memory bus 830 can be used for communicating between the processor 810 and the system memory 820. Depending on the desired configuration, processor 810 can be of any type including but not limited to a microprocessor ($\mu$P), a microcontroller ($\mu$C), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include an image matching algorithm 823 that is arranged to provide inputs to the electronic circuits, in accordance with the present disclosure. Program data 824 may include content information 825 that could be directed to any number of types of data. In some example embodiments, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include output interfaces 850 that may include a graphics processing unit 852, which can be configured to communicate to various external devices such as display devices 860 or speakers via one or more A/V ports or a communication interface 880. The communication interface 870 may include a network controller 872, which can be arranged to facilitate communications with one or more other computing devices 780 over a network communication via one or more communication ports 874. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product 900 that includes a computer program for executing a computer process on a computing device, arranged according to at least some embodiments presented herein. In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-8. Thus, for example, referring to the embodiments shown in FIG. 2, FIG. 4, and FIG. 6 one or more features of blocks 201-209, blocks 401-407, and blocks 601-605 may be undertaken by one or more instructions associated with the signal bearing medium 901.

In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming with the IEEE 902.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 800 by one or more of the computer readable medium 903, the computer recordable medium 904, and/or the communications medium 905.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
obtaining a query image that has been submitted by a user of an image search system;
determining, by the image search system, that the query image is indicated to be associated with an object;
obtaining, for the query image: (i) one or more training images of a corpus of training images that are indicated to be associated with the object, and (ii) for each one of the one or more training images that are indicated to be associated with the object, a similarity score that reflects a level of similarity between the query image and the respective training image;
determining to add the query image to the corpus of training images that are indicated to be associated with the object in response to the similarity score that reflects the level of similarity between the query image and the respective training image satisfying a threshold; and
training the image search system to recognize the object in subsequently received query images, using the corpus of training images that are indicated to be associated with the object.

2. The method of claim 1, wherein obtaining one or more training images comprises:
matching the query image to the object using a visual object recognition module; and
identifying the one or more training images based on the object.

3. The method of claim 2, wherein matching the query image to the object comprises matching a region of the query image to the object.

4. The method of claim 2, further comprising:
adding an annotation associated with the object to the query image.

5. The method of claim 1, wherein determining to add the query image to the corpus of training images comprises:
determining that the query image is characterized as a matched image; and
in response to determining that the query image is characterized as a matched image, determining to add the query image to the corpus of training images.

6. The method of claim 5, wherein determining that the query image is characterized as a matched image comprises determining that the similarity score that reflects the level of similarity between the query image and the respective training image exceeds the threshold.

7. The method of claim 1, further comprising:
obtaining one or more other query images;
determining that the query image and the one or more other query images matches a particular object; and
in response to determining that the query image and the one or more other query images matches the particular object, adding the query image and the one or more other query images to a corpus of training images associated with the particular object.

8. The method of claim 1, wherein the similarity score between the query image and the respective training image is determined based, at least on, an image distance between the query image and the respective training image.

9. A non-transitory computer-readable medium storing software having stored thereon instructions, which, when executed by one or more computers, cause the one or more computers to perform operations of:
obtaining a query image that has been submitted by a user of an image search system;
determining that the query image is indicated to be associated with an object;
obtaining, for the query image: (i) one or more training images of a corpus of training images that are indicated to be associated with the object, and (ii) for each one of the one or more training images that are indicated to be associated with the object, a similarity score that reflects a level of similarity between the query image and the respective training image;
determining to add the query image to the corpus of training images that are indicated to be associated with the object in response to the similarity score that reflects the level of similarity between the query image and the respective training image satisfying a threshold; and
training the image search system to recognize the object in subsequently received query images, using the corpus of training images that are indicated to be associated with the object.

10. The non-transitory computer-readable medium of claim 9, wherein obtaining one or more training images comprises:
matching the query image to the object using a visual object recognition module; and
identifying the one or more training images based on the object.

11. The non-transitory computer-readable medium of claim 9, further comprising:
adding an annotation associated with the object to the query image.

12. The non-transitory computer-readable medium of claim 9, wherein determining to add the query image to the corpus of training images comprises:
determining that the query image is characterized as a matched image; and
in response to determining that the query image is characterized as a matched image, determining to add the query image to the corpus of training images.

13. The non-transitory computer-readable medium of claim 9, further comprising:
obtaining one or more other query images;
determining that the query image and the one or more other query images matches a particular object; and
in response to determining that the query image and the one or more other query images matches the particular object, adding the query image and the one or more other query images to a corpus of training images associated with the particular object.

14. A system comprising:
one or more processors and one or more computer storage media storing instructions that are operable, when executed by the one or more processors, to cause the one or more processors to perform operations comprising:
obtaining a query image that has been submitted by a user of an image search system;
determining that the query image is indicated to be associated with an object;
obtaining, for the query image: (i) one or more training images of a corpus of training images that are indicated to be associated with the object, and (ii) for each one of the one or more training images that are indicated to be associated with the object, a similarity score that reflects a level of similarity between the query image and the respective training image;
determining to add the query image to the corpus of training images that are indicated to be associated with the object in response to the similarity score that reflects the level of similarity between the query image and the respective training image satisfying a threshold; and
training the image search system to recognize the object in subsequently received query images, using the corpus of training images that are indicated to be associated with the object.

15. The system of claim 14, wherein obtaining one or more training images comprises:
matching the query image to the object using a visual object recognition module; and
identifying the one or more training images based on the object.

16. The system of claim 14, wherein determining to add the query image to the corpus of training images comprises:
determining that the query image is characterized as a matched image; and
in response to determining that the query image is characterized as a matched image, determining to add the query image to the corpus of training images.

17. The system of claim 14, further comprising:
obtaining one or more other query images;
determining that the query image and the one or more other query images matches a particular object; and
in response to determining that the query image and the one or more other query images matches the particular object, adding the query image and the one or more other query images to a corpus of training images associated with the particular object.

* * * * *